United States Patent
Lee et al.

(10) Patent No.: US 7,594,152 B2
(45) Date of Patent: Sep. 22, 2009

(54) REPAIRING ERRORS IN DATA OF MBMS SERVICE

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 11/031,234

(22) Filed: Jan. 6, 2005

(65) Prior Publication Data

US 2005/0185620 A1    Aug. 25, 2005

Related U.S. Application Data

(60) Provisional application No. 60/538,086, filed on Jan. 20, 2004.

(30) Foreign Application Priority Data

Jan. 9, 2004    (KR)    ............. 10-2004-0001724

(51) Int. Cl.
H04L 1/18    (2006.01)
(52) U.S. Cl. ............... 714/748; 714/749
(58) Field of Classification Search ............ 714/748, 714/749, 750
See application file for complete search history.

(56) References Cited

U.S. PATENT DOCUMENTS

| | | | |
|---|---|---|---|
| 5,457,808 A | 10/1995 | Osawa et al. | |
| 5,459,725 A | 10/1995 | Bodner et al. | |
| 6,097,949 A | 8/2000 | Jung et al. | |
| 6,104,709 A | 8/2000 | Rinchiuso et al. | |
| 6,252,868 B1 | 6/2001 | Diachina et al. | |
| 6,252,874 B1 | 6/2001 | Lee | |
| 6,684,081 B2 | 1/2004 | Sarkkinen et al. | |
| 6,701,155 B2 | 3/2004 | Sarkkinen et al. | |
| 6,751,227 B1 | 6/2004 | Ahmavaara et al. | |
| 6,804,528 B1 | 10/2004 | Laroia et al. | |
| 6,839,348 B2 | 1/2005 | Tang et al. | |
| 6,839,565 B2 | 1/2005 | Sarkkinen et al. | |

(Continued)

FOREIGN PATENT DOCUMENTS

EP    1077539    2/2001

(Continued)

OTHER PUBLICATIONS

LG Information and Communications "TSG-RAN Working Group 2 (Radio layer 2 and Radio layer 3) TSGR2#2 (99)076 Definitions and Characteristics of Multicast Channels" Stockholm Mar. 8-11, 1999.

(Continued)

*Primary Examiner*—Scott T Baderman
*Assistant Examiner*—Sam Rizk
(74) *Attorney, Agent, or Firm*—Lee, Hong, Degerman, Kang & Waimey (57) ABSTRACT

In order to guarantee service quality for a terminal for a particular point-to-multipoint service, a broadcast or multicast radio terminal system is characterized in that after the corresponding session is complete, information regarding the data that the terminal did not properly receive is informed to the UTRAN, and then the corresponding data is received upon re-transmission from the UTRAN.

31 Claims, 5 Drawing Sheets

U.S. PATENT DOCUMENTS

| | | | |
|---|---|---|---|
| 6,882,727 B1 | 4/2005 | Vialen et al. | |
| 6,965,579 B1 | 11/2005 | Shin | |
| 6,965,580 B1 | 11/2005 | Takagi et al. | |
| 2001/0002757 A1 | 6/2001 | Honda et al. | |
| 2002/0038441 A1* | 3/2002 | Eguchi et al. | 714/748 |
| 2002/0080737 A1 | 6/2002 | Koo et al. | |
| 2002/0124069 A1 | 9/2002 | Hatalkar | |
| 2003/0007517 A1 | 1/2003 | Beckmann et al. | |
| 2003/0016698 A1 | 1/2003 | Chang et al. | |
| 2003/0157949 A1 | 8/2003 | Sarkkinen et al. | |
| 2003/0194992 A1* | 10/2003 | Kim et al. | 455/414.1 |
| 2003/0207696 A1 | 11/2003 | Willenegger | |
| 2004/0017809 A1 | 1/2004 | Park | |
| 2004/0018447 A1 | 1/2004 | Simons et al. | |
| 2004/0022218 A1 | 2/2004 | Kim et al. | |
| 2004/0057387 A1 | 3/2004 | Yi et al. | |
| 2004/0081192 A1* | 4/2004 | Koulakiotis et al. | 370/432 |
| 2004/0152473 A1* | 8/2004 | Kuwano et al. | 455/456.2 |
| 2004/0184471 A1* | 9/2004 | Chuah et al. | 370/420 |
| 2005/0076369 A1 | 4/2005 | Cai et al. | |
| 2005/0193309 A1* | 9/2005 | Grilli et al. | 714/752 |
| 2006/0019641 A1 | 1/2006 | Vayanos et al. | |
| 2006/0156370 A1 | 7/2006 | Parantainen | |
| 2006/0168504 A1* | 7/2006 | Meyer et al. | 714/799 |
| 2006/0209870 A1* | 9/2006 | Lee et al. | 370/432 |
| 2008/0052590 A1* | 2/2008 | Amlekar | 714/748 |

FOREIGN PATENT DOCUMENTS

| | | |
|---|---|---|
| EP | 1148687 | 10/2001 |
| JP | 05-219056 | 8/1993 |
| JP | 07-283782 | 10/1995 |
| JP | 09-270790 | 10/1997 |
| JP | 11-252009 | 9/1999 |
| JP | 2000-138676 | 5/2000 |
| JP | 2000-358267 | 12/2000 |
| JP | 2001-053675 | 2/2001 |
| JP | 2001-308856 | 2/2001 |
| JP | 2001-128205 | 5/2001 |
| JP | 2001-298407 | 10/2001 |
| JP | 2002-064878 | 2/2002 |
| JP | 2003-060699 | 2/2003 |
| JP | 2005-512273 | 3/2006 |
| KR | 1999-0037501 | 5/1999 |
| KR | 19990053163 A | 7/1999 |
| KR | 1999-0053163 | 10/1999 |
| KR | 2000-37821 | 7/2000 |
| KR | 200126301 | 4/2001 |
| KR | 10-2002-0009282 | 2/2002 |
| KR | 20020019314 | 3/2002 |
| KR | 20020019314 A | 3/2002 |
| KR | 20020079453 | 10/2002 |
| KR | 2003-29310 | 4/2003 |
| KR | 20030069365 | 8/2003 |
| KR | 10-2004-0064869 | 7/2004 |
| KR | 10-2005-0014984 | 2/2005 |
| WO | 9944313 | 3/1999 |
| WO | 00/54521 | 9/2000 |
| WO | 01/05158 | 1/2001 |
| WO | 01/10146 | 2/2001 |
| WO | 0241531 | 5/2002 |
| WO | 03105353 | 12/2003 |
| WO | WO 03/105353 | 12/2003 |
| WO | 2004017540 | 2/2004 |
| WO | 2004028041 | 4/2004 |
| WO | 2004028042 | 4/2004 |
| WO | 2005013914 | 2/2005 |

OTHER PUBLICATIONS

Palat et al. "Multicasting in UMTS" Third International Conference on 3G Mobile Communications Technologies, 2002.

3GPP "Digital cellular telecommunications system (Phase 2+)" 3GPP TS 03.41 version 7.4.0 Release 1998, Sep. 2000.

Holma et al. "WCDMA for UMTS" 2004.

3GPP "Technical Specification Group Services and System Aspects;Multimedia Broadcast/Multicast Service" 3GPP TS 22.146 v5.2.0, Mar. 2002.

3GPP "Technical Specification Group Services and System Aspects;Multimedia Broadcast/Multicast Service (MBMS)" 3GPP TS 23.246 v6.1.0, Dec. 2003.

Phillips "Some consideration on the L2 design of the RB carrying MBMS (update)" TSGRS #37(03)2146, Aug. 25-29, 2003.

Holma, et al., "WCDMA Technology and System Design," ISBN 7111096681, Machinery Industry Press, Jan. 31, 2002.

Holma, et al., "WCDMA for UMTS: Radio Access for Third Generation Mobile Communications," Edition 1, pp. 75-80, 123-28, 135-52, ISBN 0471720518, Wiley Technology Publishing, Jun. 7, 2000.

* cited by examiner

REPAIRING ERRORS IN DATA OF MBMS SERVICE

CROSS REFERENCE TO RELATED APPLICATIONS

The present application claims the benefit of Korean application number 10-2004-0001724, filed Jan. 9, 2004, the disclosure of which is incorporated herein by reference, and the benefit of U.S. provisional application No. 60/538,086, filed Jan. 20, 2004, the disclosure of which is incorporated herein by reference.

BACKGROUND

The present invention relates to providing wireless (radio) point-to-multipoint services, such as multimedia broadcast and multicast service (MBMS), in UMTS (Universal Mobile Telecommunications System), which is a European type IMT-2000 system, and in particular, to receiving error-free radio MBMS service by a terminal by having the UTRAN re-transmit any portions of data that was received with errors by the terminal.

A universal mobile telecommunication system (UMTS) is a third generation mobile communications system that has evolved from the European Global System for Mobile communications (GSM) that aims to provide an improved mobile communications service based upon a GSM core network and wideband code division multiple access (W-CDMA) wireless connection technology.

Figure 1:
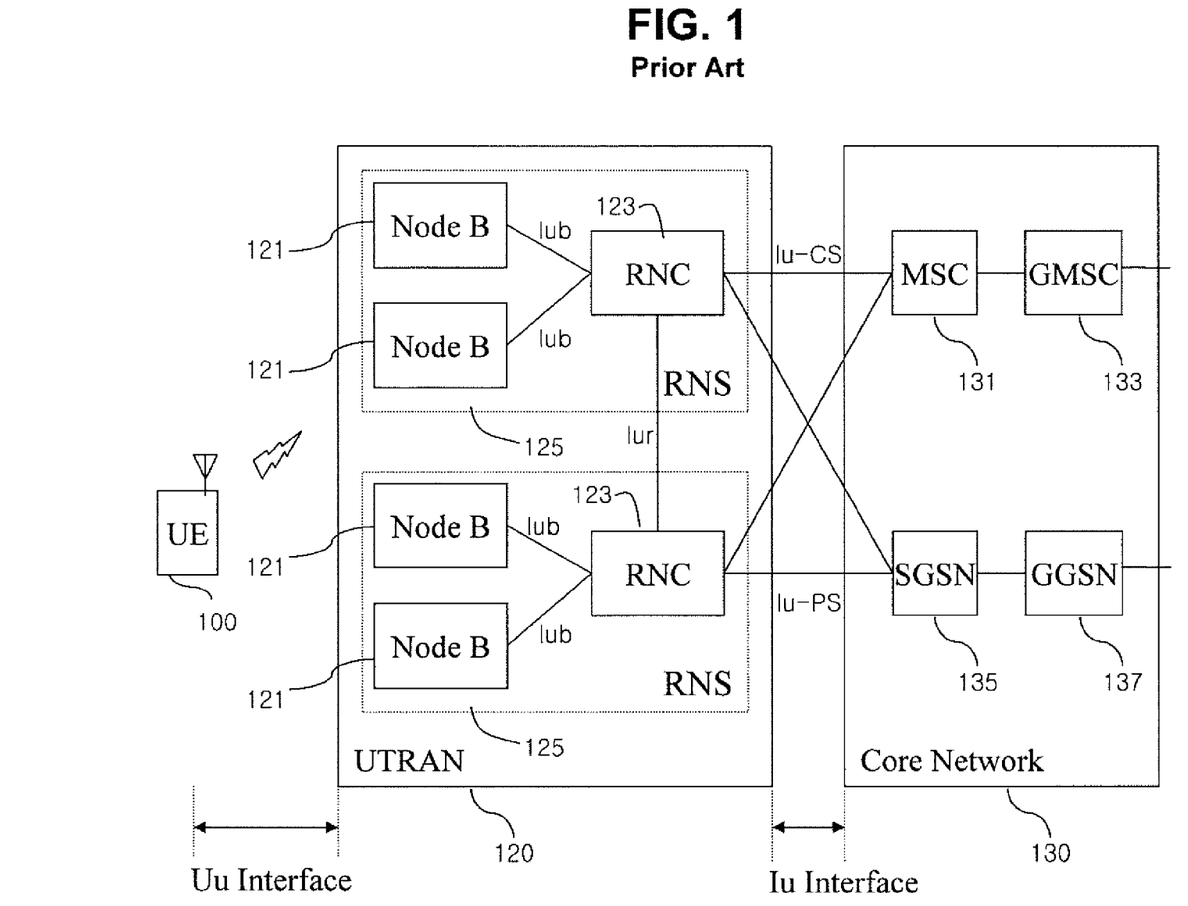
FIG. 1 depicts an exemplary basic structure of a UMTS network.

FIG. 1 illustrates an exemplary basic structure of a UMTS network. As shown in FIG. 1, the UMTS is roughly divided into a terminal 100 (or user equipment: UE), a UTRAN 120, and a core network (CN) 130. The UTRAN 120 includes one or more radio network sub-systems (RNS) 125. Each RNS 125 includes a radio network controller (RNC) 123, and a plurality of Node-Bs (base stations) 121 managed by the RNC 123. The RNC 123 handles the assigning and managing of radio resources, and operates as an access point with respect to the core network 130. The Node-Bs 121 receive information sent by the physical layer of the terminal 100 through an uplink, and transmit data to the terminal through a downlink. The Node-Bs 121, thus, operate as access points of the UTRAN 120 for the terminal 100. Also, the RNC 123 allocates and manages radio resources and operates as an access point with the core network 130.

The service provided to a particular terminal 100 is divided into circuit switched (circuit exchanged) service and packet switched (packet exchanged) service. For example, typical voice telephone service falls under circuit switched (CS) service, while web-browsing service via an Internet connection is classified as packet switched (PS) service. To support circuit switched service, the RNC 123 connects with the MSC 131 of the core network 130, and the MSC 131 connects with the GMSC 133 that manages connections coming from or going out to other networks. For packet switched service, the SGSN 135 and the GGSN 137 of the core network 130 provide appropriate services. For example, the SGSN 135 supports the packet communication going to the RNC 123, and the GGSN 137 manages the connection to other packet switched networks, such as an Internet network.

Between various network structure elements, there exists an interface that allows data to be exchanged for communication therebetween. The interface between the RNC 123 and the core network 130 is defined as the Iu interface. The Iu interface is referred to as "Iu-PS" if connected with the packet switched domain, and referred to as "Iu-CS" if connected with the circuit switched domain. Also, the interface between RNCs is referred to as "Iur" and the interface between an RNC 123 and a Node B 121 is referred to as "Iub".

Figure 2:
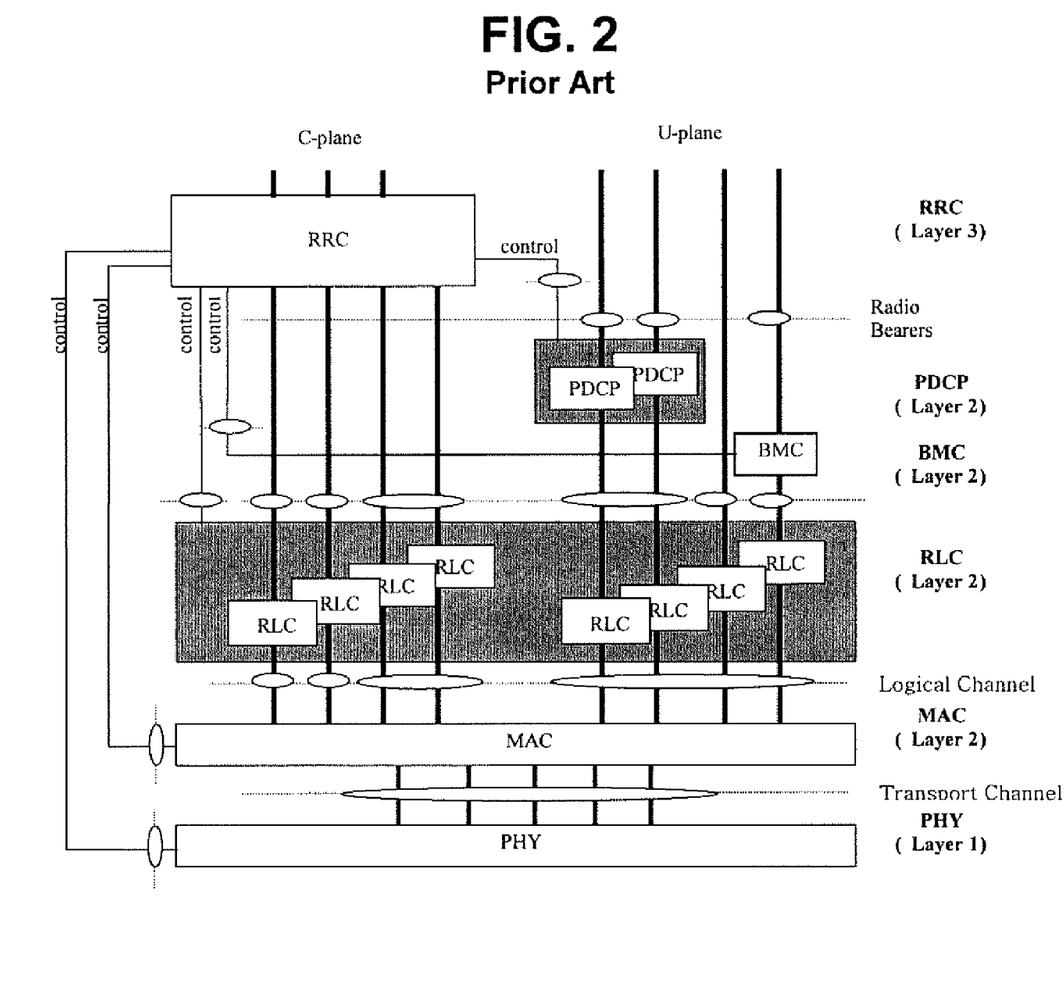
FIG. 2 depicts a radio access interface protocol architecture between the terminal and UTRAN that is based upon the 3GPP wireless access network standards.

FIG. 2 illustrates a radio interface protocol architecture (structure) between the terminal 100 and UTRAN 110 that is based upon 3GPP wireless access network technology. Here, the radio access interface protocol has horizontal layers including a physical layer, a data link layer and a network layer, and has vertical planes including a user plane for transmitting data information and a control plane for transmitting control signals. The user plane is a region to which traffic information of a user, such as voice data or Internet-protocol (IP) packets are transmitted. The control plane is a region to which control information, such as an interface of a network or maintenance and management of a call, is transmitted. In FIG. 2, protocol layers can be divided into a first layer (L1), a second layer (L2) and a third layer (L3) based upon the three lower layers of an open system interconnection (OSI) standard model that is well-known in the art of wireless (mobile) communication systems.

Each layer shown in FIG. 2 will now be described. The first layer (L1) uses various radio transmission techniques to provide information transfer service to the upper layers. The first layer (L1) is connected via a transport channel to a medium access control (MAC) layer located at a higher level, and the data between the MAC layer and the physical layer is transferred via this transfer channel.

The MAC layer handles the mapping between the logical channels and the transport channels, and provides a re-allocation service of the MAC parameter for allocation and re-allocation of radio (wireless) resources. The MAC layer is connected to an upper layer called a radio link control (RLC) layer through a logical channel, and various logical channels are provided according to the type of transmitted information. In general, when information of the control plane is transmitted, a control channel is used. When information of the user plane is transmitted, a traffic channel is used. Also, the logical channels include a common channel and a dedicated channel depending on whether the logical channel is shared. The logical channels include a dedicated traffic channel (DTCH), a dedicated control channel (DCCH), a common traffic channel (CTCH), a common control channel (CCCH), a broadcast control channel (BCCH) that provides information including information usable for the terminal to access a system, and a paging control channel (PCCH) used by the UTRAN to access a terminal.

The MAC layer is connected to the physical layer by the transport channel, and can be divided into a MAC-b sub-layer, a MAC-d sub-layer, a MAC-c/sh sub-layer, and a MAC-hs sub-layer according to the type of transport channel to be managed. The MAC-b sub-layer manages a BCH (Broadcast Channel), which is a transport channel handling the broadcasting of system information. The MAC-c/sh sub-layer manages a common transport channel, such as a forward access channel (FACH), a downlink shared channel (DSCH) or a paging channel (PCH), which is shared by a plurality of terminals. The MAC-d sub-layer manages a dedicated channel (DCH), which is a dedicated transport channel for a specific terminal.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

A broadcast/multicast control (BMC) layer performs the functions of scheduling a cell broadcast (CB) message transferred from the core network 200 and of broadcasting the CB message to UEs located in a specific cell or cells. At the UTRAN 100, the CB message transferred from the upper layer is combined with information, such as a message ID, a serial number, a coding scheme, etc., and transferred to the RLC layer in the form of a BMC message and to the MAC layer through a common traffic channel (CTCH), which is a logical channel. The logical channel CTCH is mapped to a transport channel (i.e., a forward access channel (FACH)), and to a physical channel (i.e., a secondary common control physical channel (S-CCPCH)).

A packet data convergence protocol (PDCP) layer is located at an upper layer from the RLC layer, allowing data to be transmitted effectively via a radio interface with a relatively small bandwidth through a network protocol, such as the IPv4 or the IPv6. For this purpose, the PDCP layer performs the function of reducing unnecessary control information used in a wired network, and this function is called, header compression. Various types of header compression techniques, such as RFC2507 and RFC3095 (robust header compression: ROHC), which are defined by an Internet group called the IETF (Internet Engineering Task Force), can be used. These methods allow transmission of only the absolutely necessary information required in the header part of a data, and thus transmitting a smaller amount of control information can reduce the overall amount of data to be transmitted.

The radio resource control (RRC) layer located at the lowest portion of the third layer (L3) is only defined in the control plane, and controls the transport channels and the physical channels in relation to the establishing, the re-establishing, and the releasing of the radio bearers (RBs). Here, the RB signifies a service provided by the second layer (L2) for data transmission between the terminal 10 and the UTRAN 100. In general, the establishing of the RB refers to the setting of the characteristics of the radio protocol layers and channels for providing a particular service, and also refers to the procedures in setting the individual particular parameters and operation methods.

Among the RBs, the particular RB used between the UE and the UTRAN for exchanging RRC messages or NAS messages is called a SRB (Signaling Radio Bearer). When an SRB is established between a particular UE and the UTRAN, a RRC connection exists between the UE and the UTRAN. A UE having a RRC connection is said to be in RRC connected mode, and a UE without a RRC connection is said to be in idle mode. When a UE is in RRC connected mode, the RNC determines the cell in which the UE is located (i.e., the RNC determines the UE location in units of cells), and manages that UE. For a UE in RRC connected mode, signaling messages can be sent to the UTRAN. The UE having RRC connection remains in one state, among the states of CELL_DCH, CELL_PCH, URA_PCH, or CELL_FACH, according to the instructions of the UTRAN.

In CELL_DCH state, the UE is allocated a dedicated physical channel, and uses a dedicated traffic channel and a dedicated control channel. In CELL_FACH state, the UE is allocated a dedicated control channel, and is additionally allocated a dedicated traffic channel. In CELL_PCH state and in URA_PCH state, the UE does not have a dedicated traffic channel or a dedicated logical channel established with the UTRAN. In CELL_FACH state and in CELL_DCH state, the UE can always send and receive messages with the UTRAN because a dedicated control channel exists. However, in URA_PCH state or in CELL_PCH state, when the UE has a message that needs to be sent to the UTRAN, the UE changes to the CELL_FACH state upon performing a cell update procedure and then is able to exchange messages with the UTRAN.

Next, multimedia broadcast/multicast service (MBMS) will be described. MBMS refers to a downlink transmission service for providing data services such as, streaming services (e.g., multimedia, video on demand, webcast) or background services (e.g., e-mail, short message services (SMS), downloading), to a plurality of terminals by employing a downlink dedicated MBMS bearer service. At the UTRAN, for the MBMS bearer, a point-to-multipoint (p-t-m) radio bearer and a point-to-point (p-t-p) radio bearer services are used.

MBMS can be classified into a broadcast mode and a multicast mode. The MBMS broadcast mode refers to transmitting multimedia data to all users within a broadcast area, which is a region where broadcast service is possible. In contrast, MBMS multicast mode refers to transmitting multimedia data to only a certain specified user group within a multicast area, whereby a multicast area, which is a region where multicast service is possible.

Figure 3:
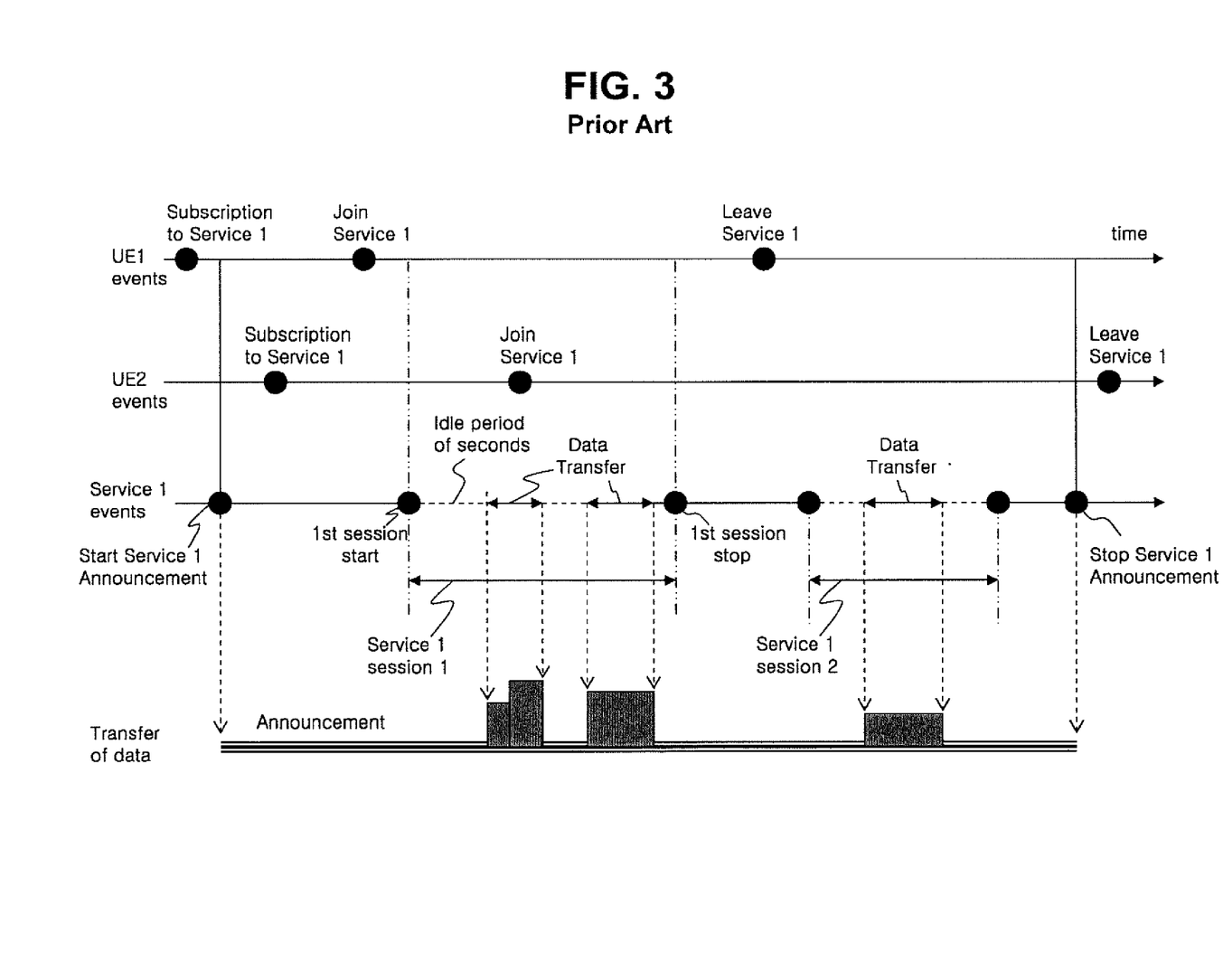
FIG. 3 depicts a process in which a UMTS network provides a particular MBMS service (service 1) by using multicast mode to the UEs (UE1 and UE2).

FIG. 3 shows a process in which a UMTS network provides a particular MBMS service (service 1) by using multicast mode. Also, FIG. 3 depicts an example when the UEs (UE1 and UE2) receive a particular service (service 1). First, the users (UE1 and UE2) desiring to receive a MBMS service must perform a subscription procedure. Here, subscription refers to the acts of establishing a relationship between the service provider and the user.

Also, users (UEs) wishing to receive an MBMS service must also receive a service announcement provided from the network. Here, service announcement refers to the function of informing the terminal about a list (index) of the services to be provided and related information. Also, if the user (UE) intends to receive a multicast mode MBMS service, the user (UE) should join a multicast subscription group. Here, 'multicast group' refers to a group of users that receive a specific multicast service, and 'joining' means merging with the multicast group that has particular users who wish to receive the specific multicast service. Using this joining procedure, the terminal can inform the UTRAN of its intent to receive the particular multicast data (multicast service). In contrast, for a terminal that has joined a particular multicast group, the procedure for terminating the joining of the multicast group is referred to as 'leaving'. The above-described subscribing, joining, and leaving procedures are performed for each terminal, and a terminal may perform the subscribing, joining, and leaving procedures before, during, or any time after data transmission.

While a particular MBMS service is in progress, one or more sessions for that service may occur in sequence. Here, a session may be defined in various ways. For example, a session may be each complete episode of a multi-episode drama or a session may be certain portions of a sports program, such as scenes that show goals in a soccer match. When data to be transmitted for a particular MBMS service is generated at the MBMS data source, the core network (CN) 130 informs a session start to the RNC 123. In contrast, when there is no further data at the MBMS data source to be transmitted for a particular MBMS service, the core network (CN) 130 informs a session stop to the RNC 123. Between the session start and the session stop, a data transfer procedure for the particular MBMS service can be performed. Here, only those terminals that have joined a multicast group for the MBMS service may receive data that is transmitted by the data transfer procedure.

In the above session start procedure, the UTRAN that received the session start from the core network (CN) transmits an MBMS notification to the terminals. Here, MBMS notification refers a function of the UTRAN for informing a terminal that the transmission of data for a particular MBMS service within a certain cell is impending. The UTRAN can use the MBMS notification procedure to perform a counting operation that determines the number of terminals that wish to receive a particular MBMS service within a particular cell. The counting procedure is used to determine whether the radio bearer for providing the particular MBMS service should be set as point-to-multipoint (p-t-m) or point-to-point (p-t-p). For selecting the MBMS radio bearer, the UTRAN internally establishes a threshold value. After performing the counting function, the UTRAN may set a point-to-point MBMS radio bearer if the number of terminals existing within the corresponding cell is smaller than the threshold value, and may set a point-to-multipoint MBMS radio bearer if the number of terminals existing within the corresponding cell is greater than or equal to the threshold value.

If a point-to-point radio bearer is to be set, the UTRAN allocates a dedicated logical channel to each terminal (UE) and sends the data of the corresponding service. If a point-to-multipoint radio bearer is to be set, the UTRAN uses a downlink common logical channel to send the data of the corresponding service.

When the system provides a particular MBMS service to the terminals (UEs) by establishing a point-to-point radio bearer, because the system is in one-to-one connection with each terminal, the system may (if necessary) receive feedback from each terminal, and use the information about which data blocks the terminal received and which data blocks the terminal did not receive, or the error rate of the data such that any necessary data blocks may be re-transmitted to the terminal. However, when a point-to-multipoint radio bearer is established, a plurality of terminals use this radio bearer, thus the system cannot receive feedback of each terminal to re-transmit data or compensate for data errors according to the reception state of each terminal. Accordingly, when the UTRAN uses a point-to-multipoint radio bearer to provide MBMS service, there will be certain terminals that could not receive data or that receive data with errors therein. When terminals do not completely receive proper data, service quality is severely degraded, thus causing problems in the conventional art.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The following description is based upon the presently preferred exemplary and non-limiting embodiments of the present invention. More particularly, various inventive concepts and principles embodied in systems and methods therein are discussed and described.

The present invention was developed in order to overcome the problems of the conventional art. The present invention provides a broadcast or multicast radio (wireless) system characterized in that for a radio (wireless) system transmitting a particular broadcast or multicast service to a plurality of terminals, and for the system to guarantee service quality to the terminal receiving the corresponding service, the UTRAN re-transmits the data of the corresponding service to the terminals after the session of the corresponding service is completed.

To achieve this by the present invention, while a session of a particular broadcast or multicast service is in progress, the UTRAN transmits to the terminals the data of the corresponding service transmitted from the CN, and at the same time, the data of the corresponding service is stored in its memory. When the session of the corresponding service ends, the UTRAN receives feedback regarding the corresponding service from the terminals and then determines the data that needs to be re-transmitted to the terminals, establishes a radio bearer to perform this re-transmission, and transmits to the terminals the data determined as needing re-transmission. Here, it should be noted that the feedback information from the terminals is not absolutely required, as the system may determine the data for re-transmission without feedback from the terminals.

The feedback information transmitted from a terminal to the system includes information about the data that was not received by the terminal or that has errors generated therein. Namely, this feedback information refers to the information that is necessary in determining which data are to be re-transmitted. More specifically, the feedback information may be the sequence number of each PDU (Protocol Data Unit) or SDU (Service Data Unit), or the sequence number of a RTP (Real-time Transport Protocol) or RTCP (RTP Control Protocol). Alternatively, the feedback information may include the transmission time information or reproduction (reconstruction) time of the data that the terminal could not receive.

In the above procedure, in order to prevent memory shortage that may occur when the UTRAN stores in its memory the data of each MBMS service, the data of the corresponding service are not stored in its memory while an MBMS session is in progress, but the UTRAN can request and receive from the core network (CN) only the data determined to be re-transmitted after the session is completed and perform re-transmission to the terminals thereafter.

In the above procedure, when the UTRAN re-transmits the data of the corresponding service, a point-to-point radio bearer is established with each terminal that requested data re-transmission in order to transmit the data for the corresponding service requested by the terminal, or when there are many is terminal that requested data re-transmissions, a point-to-multipoint radio bearer can be used to re-transmit the data of the corresponding service.

In the above procedure, for the UTRAN to distinguish between one session of a corresponding MBMS service and a re-transmission of that session, the UTRAN can establish and send an identifier to the terminals to inform that re-transmission of a session for the corresponding service is in progress, in addition to informing the terminals about the information of the radio bearer for the corresponding service or the like.

Also, in the above procedure, if the time needed for re-transmission is greater than the time period between the end of one session and the start of another session, the start of the next session may be affected by the re-transmission procedure of the previous session. To prevent this, the CN can additionally inform the UTRAN about the next session start time when sending a session stop message. Based upon this information, the UTRAN can predict its time for performing its re-transmission procedure, and accordingly, the amount of data to be re-transmitted can be controlled or the data of the corresponding service is not re-transmitted.

In order to guarantee service quality for a terminal for a particular MBMS service, the present invention provides a broadcast or multicast radio terminal (UE) system characterized in that after the corresponding session is complete, information regarding the data that the terminal did not properly receive is informed to the UTRAN, and then the corresponding data is received upon re-transmission from the UTRAN.

To achieve this by the present invention, the terminal, while a session for an MBMS service is in progress or when a MBMS session is completed, forms the information regarding the data it did not receive for the corresponding service. Also, when there are data that the terminal did not properly receive, the terminal provides information regarding this to the UTRAN. Here, the terminal may send the corresponding information by establishing a dedicated logical channel with the UTRAN, or the corresponding information may be informed to the UTRAN by using an uplink common channel. Here, the terminal may also inform the system of the amount of data that could not be received or the sequence numbers of the data not received. Thereafter, when the UTRAN begins re-transmission of data for the corresponding service, the terminal uses the radio bearer information provided from the UTRAN to establish a radio bearer, and beings to receive the corresponding data after the radio bearer is established.

Figure 4:
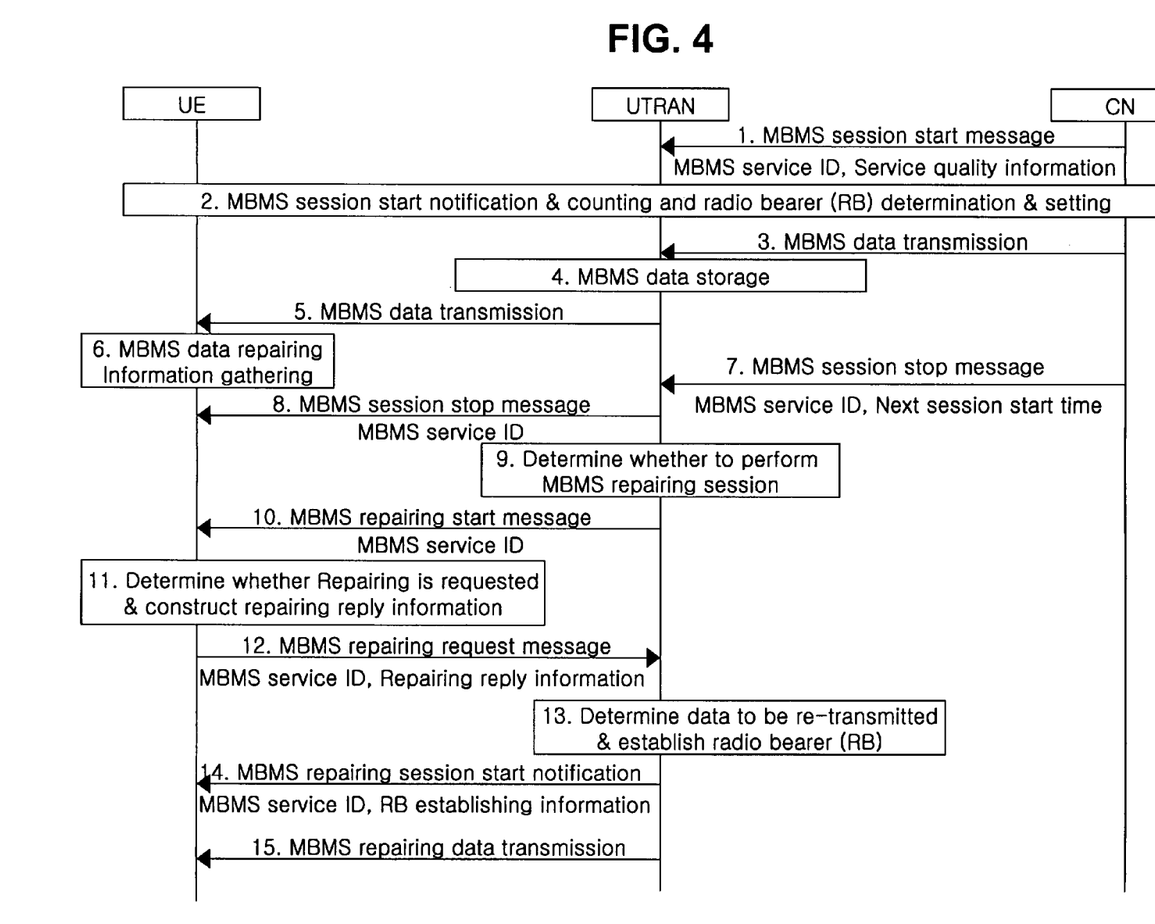
FIG. 4 depicts the operational procedures of a system constructed according to an embodiment of the present invention.

FIG. 4 depicts the operational procedures of a system constructed according to an embodiment of the present invention.

In step 1, the CN sends a MBMS session start message to the UTRAN.

In step 2, the UTRAN notifies the terminals that a session will start soon, and determines the type of radio bearer to be used by using a counting procedure. When the radio bearer is determined, the UTRAN informs the terminals of the information necessary to set the radio bearer.

In step 3, the UTRAN receives data for the session of the corresponding service from the CN. This MBMS data is transmitted from the CN to the UTRAN until the session ends.

In steps 4 and 5, the UTRAN stores the MBMS data received in step 3 in its memory, and simultaneously transmits this data to the terminal by using the radio bearer established in a corresponding cell.

In step 6, as the terminal receives the corresponding service through the established radio bearer, and among the data of the corresponding service, collects information about those portions not received or received but containing errors.

In steps 7 and 8, the session stop message from the CN arrives at the UTRAN. Also, the UTRAN informs the terminals that the session has stopped. Here, the session stop message transmitted from the CN may additionally include information regarding the start time of the next session.

In step 9, The UTRAN determines whether a MBMS repairing session should be started. Here, the UTRAN may use the start time information of the next session included in the session stop message transmitted from the CN. If it is decided that the MBMS repairing session should be started, the UTRAN performs the subsequent procedures from step 10, and if not, the subsequent steps are not performed. Here, the MBMS repairing session refers to a session performed by the UTRAN for re-transmitting a portion of or all of the session data for the corresponding service to the terminal that did not properly receive the session data for the corresponding service, after a session for a particular MBMS service is completed.

In step 10, the UTRAN informs the terminal that a MBMS repairing session will start soon. Here, the UTRAN may inform the terminals about the information that the terminals need to transmit when replying to the UTRAN or other information such as the conditions that the terminal must satisfy when repairing is requested. Additionally, the UTRAN can provide references used to determine which data was not received by the terminal by providing information about the corresponding session, for example, the total data amount of the corresponding session or the total reproduction (reconstruction) time of the data.

In step 11, based upon the contents received in step 10, the terminal determines whether a repairing session for the corresponding MBMS service is needed. Here, the terminal may use the amount of MBMS data it did not receive or the number of MBMS data blocks it did not receive. Also, if the terminal determines that a MBMS repairing session is needed, repairing reply information is generated as instructed by the UTRAN. If the terminal properly received all data for the corresponding service, the terminal need not send the repairing request message information to the UTRAN.

In step 12, the terminal sends the repairing reply information generated in step 11 in the MBMS repairing request message to the UTRAN.

In step 13, the UTRAN determines whether re-transmission should be performed and determines the data to be re-transmitted based upon the information transmitted by the terminals in step 12. The data to be re-transmitted can be the data that could not be received by more than a set number of terminals, or the data corresponding to a certain time period of a corresponding service, or all of the data of the corresponding service, or the like. Here, the UTRAN may refrain from starting the MBMS repairing session based upon the next session start time and the replay information of the terminal informed by the CN, or the amount of data to be re-transmitted can be appropriately re-adjusted according to the time remaining until the next session start time. Also, if the number of terminals requesting MBMS repairing is less than a certain reference value, the UTRAN uses a point-to-point radio bearer or uses a point-to-multipoint radio bearer if greater than or equal to the reference value, to re-transmit the MBMS data. If a point-to-point radio bearer is used, the UTRAN establishes a point-to-point radio bearer with each of the terminals and re-transmits MBMS data according to the reply information of each terminal. Also, if a point-to-multipoint radio bearer is used, the UTRAN performs the procedures of step 14.

In step 14, if the point-to-multipoint radio bearer is to be used, the UTRAN informs the terminal that the MBMS repairing session will soon start, and informs the parameters to be used for establishing the radio bearer. Also, the UTRAN, based upon the contents determined in step 13, establishes the radio bearer, informs the terminals about the establishment information of the corresponding radio bearer, and begins re-transmission of data for the corresponding service. Here, it should be noted that a MBMS session start notification message can be used instead of the MBMS repairing session start notification message. In this case, a repairing session indicator is additionally established to inform the terminals that the corresponding session is a session is for performing repairing, in order to prevent unnecessary repeated reception of the corresponding session by a terminal that has properly received all data without any errors.

In step 15, among the data stored in its memory, the UTRAN transmits the data to be re-transmitted using the radio bearer established in the previous step, and the terminals that had requested repairing receives the transmitted data. Here, if the data of a corresponding session has not been stored due to the lack of memory in the UTRAN, then the UTRAN may request the data to be re-transmitted to the CN and receive the same therefrom.

In the conventional art, if MBMS service is provided by using a point-to-multipoint radio bearer, there is no way for the terminal to correct the situation where portions of data are not received due to poor channel conditions or if errors are generated in the received data. By having the UTRAN re-transmit the data that the terminal did not receive for a corresponding service, the present invention can guarantee the quality of the corresponding service.

Figure 5:
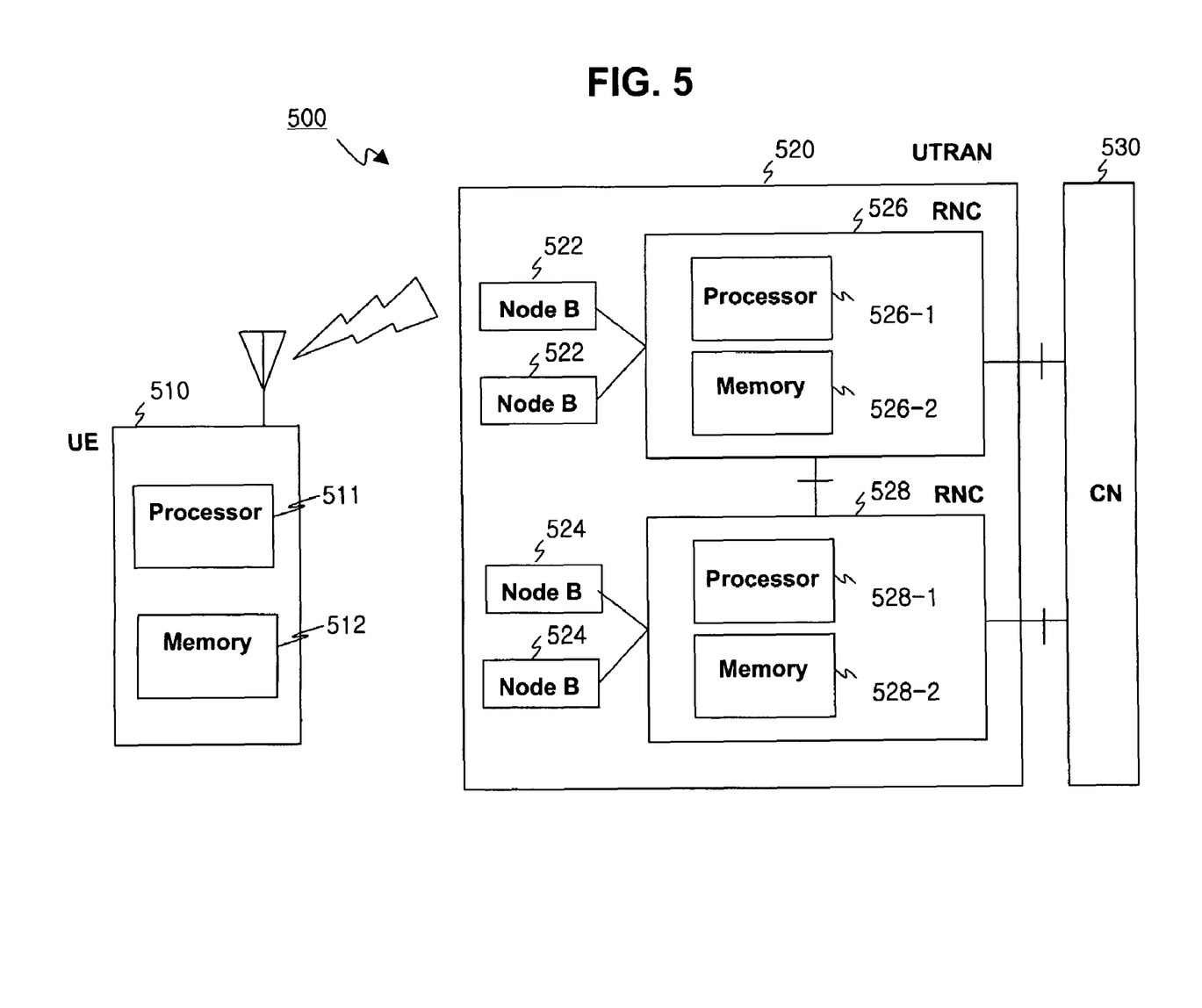
FIG. 5 depicts a communications system structure including a terminal (UE) and a network (UTRAN) according to an embodiment of the present invention.

The present invention can employ a variety of software, hardware, and/or a combination thereof to achieve the above-identified procedures and steps. For example, FIG. 5 depicts a communication system comprising a terminal (UE 510) in radio communication with a network (UTRAN 520 and CN 530) according to an embodiment of the present invention. The network (UTRAN 520 and CN 530) may include various hardware and software components. For example, the UTRAN 520 comprises an RNC (526), being connected to a plurality of Node Bs (522), and having a processor (526-1) and a memory (526-2). An RNC (528), being connected to a plurality of Node Bs (524), may also comprise a processor (528-1) and a memory (528-2). The RNCs (526, 528) are connected with one another via an interface, and connected with the CN (530) via another interface. The network (UTRAN 520 and CN 530) handles the various signal processing procedures for communication with the terminal (UE 510) as described previously. Here, it should be noted that various software codes and protocols that are required for achieving the present invention may be stored in one or more memory devices and executed by one or more processors located within the Node Bs (822, 824), the RNCs (826, 828), and/or other network elements.

The present invention provides a method of receiving a point-to-multipoint service in a mobile terminal using data error correction, the method comprising: receiving data blocks of a point-to-multipoint service during a session; transmitting a repairing request to a network in a point-to-point manner, the repairing request including information of at least one data block that was unsuccessfully received during the session; and receiving the at least one data block from the network after a session stop, such that the unsuccessfully received data blocks are successfully received.

The present invention also provides a method of providing a point-to-multipoint service from a communications network using data error correction, the method comprising: transmitting data blocks of a point-to-multipoint service during a session; receiving a repairing request from a terminal in a point-to-point manner, the repairing request including information of at least one data block that was unsuccessfully received during the session; and transmitting the at least one data block to the terminal after a session stop, such that the unsuccessfully received data blocks are successfully received by the terminal.

Additionally, the present invention provides a mobile terminal for receiving a point-to-multipoint service using data error correction, the terminal comprising: an antenna; a memory having software codes stored therein; and a processor connected with the antenna and the memory, the processor executing the software codes for, receiving, via the antenna, data blocks of a point-to-multipoint service during a session; transmitting, via the antenna, a repairing request to a network in a point-to-point manner, the repairing request including information of at least one data block that was unsuccessfully received during the session; and receiving, via the antenna, the at least one data block from the network after a session stop, such that the unsuccessfully received data blocks are successfully received.

Furthermore, the present invention provides a communications network for providing a point-to-multipoint service using data error correction, the network comprising: a memory having software codes stored therein; and a processor connected with the memory, the processor executing the software codes for, transmitting data blocks of a point-to-multipoint service during a session; receiving a repairing request from a terminal in a point-to-point manner, the repairing request including information of at least one data block is that was unsuccessfully received during the session; and transmitting the at least one data block to the terminal after a session stop, such that the unsuccessfully received data blocks are successfully received by the terminal.

Preferably, the network can comprise a core network or a UTRAN. Here, the UTRAN can store point-to-multipoint service data sent from a core network, and can select the repairing data from the stored point-to-multipoint service data. Also, the UTRAN can request the repairing data from a core network without storing point-to-multipoint service data in the UTRAN.

For the method of data error correction for the terminal, the method of data error correction for the network, the terminal, and the network described above, the following additional features are preferred. Preferably, a session can be defined as a time period during which particular data is sent by the network. Also, the step of receiving data blocks of the point-to-multipoint service can be performed in a point-to-multipoint manner, and the step of receiving data locks of the point-to-multipoint service can be performed in a point-to-point manner. Additionally, the information can be a sequence number for a packet, while a packet can be a protocol data unit, a service data unit, a real-time transport protocol packet or a RTP control protocol packet. Preferably, the information can be associated with a data transmission time or a data play time, or the information can e associated with an amount of the at least one data block that was unsuccessfully received. The information can be generated while the session is in progress or after the session is completed. Preferably, the transmitting step can be performed via a dedicated logical channel or an uplink common channel.

Although various aspects, embodiments, and features of the present invention have been described for a UMTS communications scheme, many of these techniques can be advantageously applied for other communications methods and systems.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but us to be accorded the widest scope consistent with the principles and novel features disclosed herein.

What is claimed is:

1. A method of receiving a point-to-multipoint service in a mobile terminal, the method comprising:
   receiving data blocks of the point-to-multipoint service during a session;
   transmitting a repairing request to a network, the repairing request including information of at least one data block that was received unsuccessfully during the session; and
   receiving the at least one data block from the network after the session is completed, wherein the session of the point-to-multipoint service is identifiable by an identifier,
   wherein the identifier distinguishes a transmission of the session from a retransmission of the session.

2. The method of claim 1, wherein the session is a time period during which particular data is sent by the network.

3. The method of claim 1, wherein the step of receiving data blocks of the point-to-multipoint service is performed in one of a point-to-multipoint manner and a point-to-point manner.

4. The method of claim 1, wherein the information is a sequence number for a packet.

5. The method of claim 4, wherein the packet is one of a protocol data unit (PDU), a service data unit (SDU), a real-time transport protocol (RTP) packet and a RTP control protocol (RTCP) packet.

6. The method of claim 1, wherein the information is associated with one of a data transmission time and a data play time.

7. The method of claim 1, wherein the information is associated with an amount of the at least one data block that was unsuccessfully received.

8. The method of claim 1, wherein the information is generated while the session is in progress.

9. The method of claim 1, wherein the information is generated after the session is completed.

10. The method of claim 1, wherein the transmitting step is performed via one of a dedicated logical channel and an uplink common channel.

11. The method of claim 1, wherein the transmitting step comprises:
   checking whether a reception condition of the data blocks satisfies a repairing request condition that was set by the network during the session; and
   creating repairing response information based on response condition information set by the network and transmitting the created repairing response information to the network in order to request repairing if the reception condition of the data blocks satisfies the repairing request condition.

12. The method of claim 1, wherein the repairing request is transmitted to the network in a point-to-point manner.

13. The method of claim 1, further comprising receiving a notification for a start of the session.

14. The method of claim 1, further comprising receiving a message that informs a completion of the session.

15. The method of claim 1, further comprising receiving a repairing start message.

16. The method of claim 1, further comprising receiving a notification for a start of the retransmission of the session.

17. A method of providing a point-to-multipoint service from a communications network, the method comprising:
   transmitting data blocks of the point-to-multipoint service during a session;
   receiving a repairing request from a terminal, the repairing request including information of at least one data block that was received unsuccessfully during the session; and
   transmitting the at least one data block to the terminal after the session is completed, the session of the point-to-multipoint service is identifiable by an identifier,
   wherein the identifier distinguishes a transmission of the session from a retransmission of the session.

18. The method of claim 17, wherein the session is a time period during which particular data is sent by the network.

19. The method of claim 17, wherein the step of transmitting data blocks of the point-to-multipoint service is performed in one of a point-to-multipoint manner and a point-to-point manner.

20. The method of claim 17, wherein the information is a sequence number for a packet.

21. The method of claim 20, wherein the packet is one of a protocol data unit (PDU), a service data unit (SDU), a real-time transport protocol (RTP) packet and a RTP control protocol (RTCP) packet.

22. The method of claim 17, wherein the information is associated with one of a data transmission time and a data play time.

23. The method of claim 17, wherein the information is associated with an amount of the at least one data block that was unsuccessfully received.

24. The method of claim 17, wherein the terminal generates the information while the session is in progress.

25. The method of claim 17, wherein the terminal generates the information after the session is completed.

26. The method of claim 17, wherein the receiving step is performed via one of a dedicated logical channel and an uplink common channel.

27. The method of claim 17, wherein the repairing request is received from the terminal in a point-to-point manner.

28. The method of claim 17, further comprising transmitting a notification for a start of the session.

29. The method of claim 17, further comprising transmitting a message that informs a completion of the session.

30. The method of claim 17, further comprising transmitting a repairing start message.

31. The method of claim 17, further comprising transmitting a notification for a start of the retransmission of the session.

* * * * *